US009168723B2

(12) United States Patent
Galant

(10) Patent No.: US 9,168,723 B2
(45) Date of Patent: Oct. 27, 2015

(54) DEVICE FOR REVERSIBLY FASTENING A PANEL TO A STRUCTURE SO AS TO OBTAIN A WINDOW IN THAT STRUCTURE, A VEHICLE, AND A METHOD

(71) Applicant: AIRBUS HELICOPTERS, Marignane (FR)

(72) Inventor: Herve Galant, Chateauneuf les Martigues (FR)

(73) Assignee: Airbus Helicopters, Marignane (FR)

( * ) Notice: Subject to any disclaimer, the term of this patent is extended or adjusted under 35 U.S.C. 154(b) by 448 days.

(21) Appl. No.: 13/716,537

(22) Filed: Dec. 17, 2012

(65) Prior Publication Data

US 2013/0164074 A1    Jun. 27, 2013

(30) Foreign Application Priority Data

Dec. 27, 2011    (FR) ...................... 11 04113

(51) Int. Cl.
| | | |
|---|---|---|
| B64C 1/14 | (2006.01) | |
| B32B 33/00 | (2006.01) | |
| B60J 10/00 | (2006.01) | |
| F16B 11/00 | (2006.01) | |

(52) U.S. Cl.
CPC ............. *B32B 33/00* (2013.01); *B60J 10/0071* (2013.01); *B64C 1/1461* (2013.01); *F16B 11/006* (2013.01); *Y10T 403/11* (2015.01)

(58) Field of Classification Search
CPC ..... Y10T 403/16; Y10T 403/477; B64C 1/14; B64C 1/1476; B64C 1/1484; B64C 1/1492
See application file for complete search history.

(56) References Cited

U.S. PATENT DOCUMENTS

| | | | | |
|---|---|---|---|---|
| 4,876,132 | A | * | 10/1989 | Kunert .......................... 296/84.1 |
| 5,057,354 | A | * | 10/1991 | Kunert et al. ................. 296/84.1 |
| 5,186,807 | A | * | 2/1993 | Sanford et al. ................ 204/618 |
| 6,308,918 | B1 | | 10/2001 | Ferrier |
| 6,929,844 | B2 | | 8/2005 | Orten |
| 7,040,063 | B2 | * | 5/2006 | Leconte ..................... 296/96.21 |

FOREIGN PATENT DOCUMENTS

| | | |
|---|---|---|
| DE | 3722657 C1 | 2/1989 |
| DE | 20217925 U1 | 3/2003 |
| EP | 0367662 A2 | 5/1990 |
| FR | 2766156 A1 | 1/1990 |

OTHER PUBLICATIONS

Search Report and Written Opinion; Application No. FR. 1104113; dated Jul. 18, 2012.

* cited by examiner

*Primary Examiner* — Michael P Ferguson
(74) *Attorney, Agent, or Firm* — Brooks Kushman P.C.

(57) ABSTRACT

A device (10) for reversibly fastening a panel (5) to a structure (2) in order to close off a window (3) in said structure (2). Said device (10) is made up of a plurality of studs (15) suitable for being embedded in a bead of adhesive (50), each stud (15) being provided with two longitudinal orifices (16), said device having two extraction wires (30), each of which passes through a longitudinal orifice (16) in each stud (15).

18 Claims, 2 Drawing Sheets

DEVICE FOR REVERSIBLY FASTENING A PANEL TO A STRUCTURE SO AS TO OBTAIN A WINDOW IN THAT STRUCTURE, A VEHICLE, AND A METHOD

CROSS REFERENCE TO RELATED APPLICATIONS

This application claims priority to French patent application No. FR 11 04113 filed on Dec. 27, 2011, the disclosure of which is incorporated in its entirety by reference herein.

BACKGROUND OF THE INVENTION (1) Field of the Invention

The present invention relates to a device that facilitates mounting a panel closing off a window in a structure, and that facilitates removing such a panel. The present invention also relates to a vehicle provided with such a device, and to a method of implementing it.

More particularly, the invention lies in the restricted technical field of mounting/removing a panel closing off an opening in an aircraft structure.

(2) Description of Related Art

The term "panel" is therefore used below to mean a member that is advantageously transparent and that closes off a window in a structure. By way of example, this panel may comprise a pane of glass or indeed a window pane made of Plexiglas.

It is common to use adhesive for securing a transparent panel to a vehicle structure, and in particular to an aircraft structure. Thus, Plexiglas or glass windows are usually adhesively bonded.

For example a Plexiglas panel can be adhesively bonded directly to a structure of a fuselage in order to close off a bay. A bead of adhesive is then placed between the panel and the structure in order to perform the adhesive bonding.

In order to release a broken Plexiglas panel, an operator sometimes inserts a saw between said panel and the structure in order to cut through the bead of adhesive.

That technique is effective but lengthy and difficult to implement.

The beads of adhesive that are used in the field of aviation have a width that is large, being about two to three centimeters, and a thickness that is small, being about three millimeters. It is then difficult to position and to use a saw for releasing the panel without damaging the structure and/or the panel.

The releasing operation can then require the aircraft to be taken out of service for relatively long and costly time.

In addition, a glass panel sometimes comprises a pane of glass that is fastened to a support which is in turn adhesively bonded to a fuselage.

An operator can then remove the pane of glass from the support and then implement the above-described technique for releasing the support from the fuselage.

A technique for releasing a transparent panel is also known that is in common use for releasing windshields in the automobile field.

An operator drills a hole through a bead of adhesive.

The operator then threads a strong filamentary element usually referred to as a "piano wire" through the drilled hole. Two operators take hold of respective ones of the ends of the filamentary element so as to move said filamentary element between the panel to be released and the structure, thereby slicing through the bead of adhesive.

Once the panel has been disunited from the structure, an operator cleans the panel and the structure so as to remove the residue of the adhesive. By way of example, the operator might therefore heat the surfaces to be cleaned before applying a cleaning substance that is optionally of the antioxidant type.

That technique is advantageous. However, it is difficult or indeed impossible to implement on an aircraft having a wide, thin bead of adhesive that is particularly strong once in the set state. The force the operators need to apply to slice through such a bead of adhesive is too large for applying that technique.

In addition, the drilling step can be complicated to perform in view of the small thickness of the bead of adhesive.

Releasing a transparent aircraft panel is then a difficult operation.

The width of the bead of adhesive could be reduced in order to implement the method that is applied to an automobile windshield. However, the pressure and sealing conditions that apply to an aircraft panel appear incompatible with such a reduction in width.

The technological background includes Document U.S. Pat. No. 5,069,012 relating to using adhesive for bonding a panel to a structure.

That document proposes placing a bead of adhesive on the panel and arranging a seal between the panel and the structure. That seal is hollow and an extraction wire is placed inside it.

It appears difficult to apply that technique to an aircraft, since the beads of adhesive used in the aviation field are wide.

Similarly, Document U.S. Pat. No. 6,929,844 proposes placing an elastomer member on a contact surface of a panel. That member has a ridge provided with a groove open to the outside and receiving an extraction wire.

In addition, that member includes a plane portion integral with the ridge and with its contact surface, the groove in the ridge opening out onto a free face of said plane portion.

A bead of adhesive is then placed over the free face and over a pane of glass in order to fasten the pane of glass to a structure.

By pulling the extraction wire out of the groove, it is possible to slice through the bead of adhesive.

However, it appears difficult to slice through a wide bead of adhesive.

Document EP 0 367 662 presents a calibrated shaped-section member interposed between a bead of adhesive and a panel. An extraction wire is used for slicing through the calibrated shaped-section member.

Documents DE 37 22 657, FR 2 766 156, and DE 202 17 925 are also known.

BRIEF SUMMARY OF THE INVENTION

An object of the present invention is therefore to propose a device for reversibly fastening a panel to a structure so as to close off an opening in said structure. The device aims to enable a panel that is bonded to an aircraft structure by means of a wide and strong bead of adhesive to be removed rapidly.

In accordance with the invention, a device for reversibly fastening a panel to a structure in order to close off a window in said structure is remarkable, in particular, wherein said device is made up of a plurality of studs suitable for being embedded in a bead of adhesive, each stud being provided with two longitudinal orifices. Said device then has two extraction wires, each of which passes through a longitudinal orifice in each stud.

Then, by pulling on each extraction wire, it becomes possible to slice through a bead of adhesive that is of large width.

There is no need for each extraction wire to travel through the entire width of the bead of adhesive, but rather only a need for it to travel through the distance between the extraction wire and the outside of the bead of adhesive. For example, each extraction wire may be caused to slice through one half of the width of a bead of adhesive.

In addition, each stud may act as a shim and make it possible to define the thickness of the bead of adhesive accurately.

It should be noted that the "thickness" of a bead of adhesive means the dimension of the bead of adhesive between the panel and the structure to which the panel is adhesively bonded.

The "width" of the bead of adhesive is the shortest distance over which the bead of adhesive extends over the panel.

Thus, a bead of adhesive extends longitudinally over its largest dimension, namely its length, extends in elevation over its smallest dimension, namely its thickness, and extends transversely in an intermediate dimension, namely its width.

In addition, it can be understood that the device can be installed easily for adhesively bonding a panel to a structure.

Finally, this device may be applied independently from the shape of the panel and from the structure receiving the panel.

In addition, the invention may have one or more of the following additional characteristics.

For example, the device may have a bead of adhesive, the studs being embedded in said bead of adhesive, each extraction wire extending from a first end towards a second end while going through a central portion, each central portion being embedded in the bead of adhesive.

The studs and the central portions of the extraction wires are then embedded in the bead of adhesive.

Conversely, the first end and the second end of each extraction wire are not embedded in the bead of adhesive.

An operator can thus slice through the bead of adhesive by taking hold of the first end and of the second end of each extraction wire by hand or by using a suitable tool.

With each extraction wire extending from a first end towards a second end while going through a central portion, at least one end may be provided with graspable means. The graspable means are optionally removable so as to enable the extraction wire to be inserted through the longitudinal orifices.

In one embodiment, each extraction wire is slid into a longitudinal orifice in a stud.

In another embodiment, at least one stud may be provided with at least one transverse groove communicating with a longitudinal orifice. Each transverse groove facilitates insertion of an extraction wire into a longitudinal orifice, and extraction of said wire therefrom in a direction distinct from a direction in which said longitudinal orifice extends.

The transverse groove makes it possible, in particular, to slide an extraction wire across the stud so as to place said extraction wire in the corresponding longitudinal orifice.

Thus, the presence of graspable means on one end of an extraction wire does not complicate placing the extraction wire in a stud.

In another aspect, the studs have a thickness and a width, and the bead of adhesive extends against a peripheral surface of the panel, which surface is to be adhesively bonded, firstly over a width of adhesive that is greater than two centimeters and greater than the width of said stud, and secondly from said peripheral top surface to be adhesively bonded over a thickness that is less than five millimeters and equal to the thickness of said studs.

The width of a stud then corresponds to the largest dimension of the stud. For a cylindrical stud having a circular base, the width of the stud may, for example, be the diameter of said base.

In addition, the width of the bead of adhesive may be equal to twice the width of the stud.

The stud is advantageously arranged in the center of the bead of adhesive so that the extraction wires have to slice through the same width of bead of adhesive.

In addition, each stud is provided with two longitudinal orifices comprising an inner longitudinal orifice and an outer longitudinal orifice, and one extraction wire passes through all of the inner longitudinal orifices and the other extraction wire passes through all of the outer longitudinal orifices.

An inner extraction wire of a device arranged on a vehicle is placed between an outer extraction wire and the inside of the vehicle, while the outer extraction wire is placed between the inner extraction wire and the outside of the vehicle.

Thus, the device avoids any interference between the two extraction wires.

In addition, at least one stud has at least one self-adhesive face facilitating adhesion of the stud to a support.

The invention also provides a vehicle provided with a structure having a peripheral wall defining a window and a panel closing off said window.

The vehicle is then remarkable, in particular, in that said vehicle includes a reversible fastening device as described above for adhesively bonding the panel to the peripheral wall.

Optionally, the device is interposed between a first coat of keying primer placed on the peripheral wall and a second coat of keying primer placed on a peripheral surface of the panel, which surface is to be adhesively bonded.

In addition, in a variant, each extraction wire extends from a first end towards a second end while going through a central portion, and the ends of one extraction wire are arranged inside the vehicle and the ends of the other extraction wire are arranged outside the vehicle.

It is possible to provide recesses in the vehicle for the purpose of receiving the ends of the extraction wires.

In addition, the invention provides a method of securing together two supports comprising respectively firstly a peripheral surface of a panel, which surface is to be adhesively bonded, and secondly a peripheral wall defining a window in a structure, said method implementing the above-described reversible fastening device. Said method comprises the following steps:

fastening each stud to a support;

arranging two extraction wires, each extraction wire passing all the way through a longitudinal orifice in each stud;

placing a bead of adhesive on said support that is equipped with said studs, each stud being embedded in said bead of adhesive, and first and second ends of each extraction wire being kept outside the bead of adhesive; and placing the support that is not equipped with said studs on said bead of adhesive.

Optionally, each stud is placed in the middle of the bead of adhesive.

BRIEF DESCRIPTION OF THE SEVERAL VIEWS OF THE DRAWINGS

The invention and its advantages appear in more detail from the following description of embodiments given by way of illustration and with reference to the accompanying figures, in which.

DETAILED DESCRIPTION OF THE INVENTION

Elements that are present in more than one of the figures are given the same references in each of them.

Figure 1:
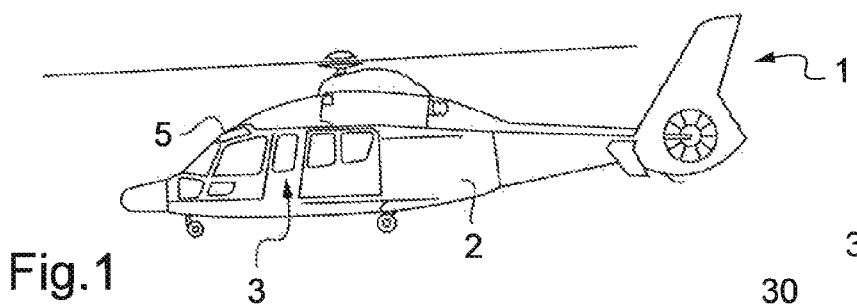
FIG. 1 is a view of a vehicle of the aircraft type.

FIG. 1 is a view of a vehicle 1 provided with a carrier structure 2. More precisely, the vehicle is an aircraft of the rotorcraft type, the structure 2 representing the fuselage of the aircraft.

This vehicle 1 is provided with a plurality of windows 3 closed off by transparent panels.

The vehicle 1 is then provided with reversible fastening devices for bonding certain panels 5 to the structure 2 by means of adhesive.

When the vehicle is an aircraft, the beads of adhesive used for fastening a panel to a structure have specific dimensions, insofar as the stresses exerted on the panels are demanding compared with the stresses observed in the automobile field, in particular.

In the aviation field, the beads of adhesive are thus generally wide and of small thickness, whereas the beads of adhesive used in the automobile field are thick and of small width.

Figure 2:
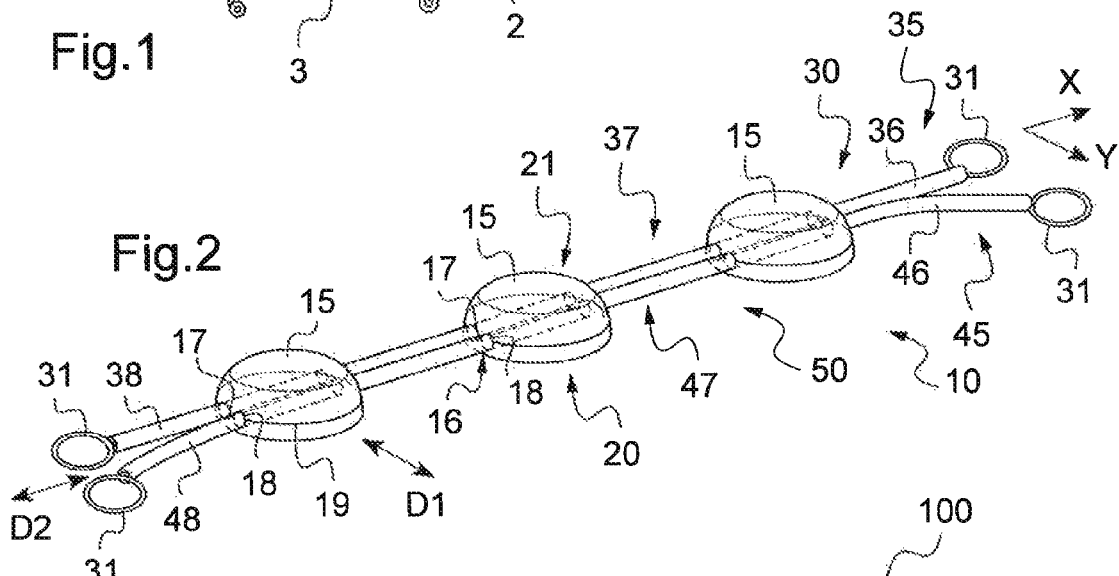
FIG. 2 is a diagram showing a fastening device of the invention.

FIG. 2 shows such a fastening device 10.

This device 10 comprises a plurality of studs 15 suitable for co-operating with a bead of adhesive.

In particular, each stud 15 is provided with a body that is perforated longitudinally so that it has two longitudinal orifices 16.

The two longitudinal orifices may be superposed or arranged side-by-side as in the preferred embodiment shown. It can be understood that the embodiment shown in FIG. 2 is more suited to an aviation application requiring a small stud height.

In addition, at least one stud 15 may have at least one self-adhesive face 20, 21, in order to facilitate securing it to a panel or to a structure.

Furthermore, the device 10 includes two extraction wires 30 suitable for slicing through a bead of adhesive. Each extraction wire may be of the "piano wire" type.

Therefore, each extraction wire 30 passes through a longitudinal orifice 16 in each stud 15. Each extraction wire is then suitable for sliding in a longitudinal orifice in each stud.

Each extraction wire thus extends from a first end 36, 46 to a second end 38, 48, while going through a central portion 37, 47 that passes through the studs 15.

The studs 15 and the central portion 37, 47 of each extraction wire are then arranged in a bead of adhesive 50 that is not visible in FIG. 2.

Conversely, the first end 36, 46 and the second end 38, 48 of each extraction wire are not disposed in the bead of adhesive. An operator can then take hold of them by hand or by using a tool.

It should be noted that each end 36, 46, 38, 48 may be provided with graspable means 31 making it easier to take hold of, such as a loop as in the example shown.

Each graspable means 31 may be removable or integral with the associated end.

In one embodiment, an extraction wire is arranged in a longitudinal orifice 16 by inserting and pushing the end of an extraction wire 30 into the longitudinal orifice in question.

The stud is then made of a material that can be sliced through by the extraction wire as a result of a force being exerted manually. This material may, in particular, be part of the group comprising elastomers.

In another embodiment, a stud may be provided with one transverse groove 19 per longitudinal orifice. Each transverse groove communicates with the outside of the stud 15 to allow the extraction wire to be inserted into and extracted from the associated longitudinal orifice, in a direction D1 that is referred to by convenience as the "transverse direction", and that is distinct from a direction D2 in which the longitudinal orifice 16 extends.

In addition, the two longitudinal orifices may constitute respectively an "inner" longitudinal orifice 17 and an "outer" longitudinal orifice 18. Once installed on a vehicle, the inner longitudinal orifice of a stud faces towards the inside of the vehicle, while the outer longitudinal orifice of said stud faces towards the outside of said vehicle.

Then, in order to prevent interference between the extraction wires, an extraction wire 35 referred to by convenience as the "inner extraction wire" passes through all of the inner longitudinal orifices 17, while the other extraction wire 45 referred to by convenience as the "outer extraction wire" passes through all of the outer longitudinal orifices 18.

FIGS. 3 to 7 show a method implemented by said device 10.

Figure 3:
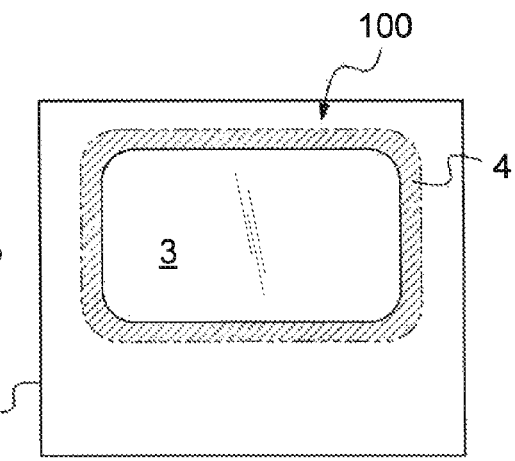
FIGS. 3 to 7 are views explaining the method of the invention.

With reference to FIG. 3, this method aims to secure together two supports by means of a bead of adhesive that can be sliced through.

Thus, the method aims to secure a support 100 having a peripheral wall 4 defining a window 3 to another support having a peripheral surface of a panel, which surface is to be adhesively bonded. Such a panel is optionally a transparent panel based on glass or Plexiglas or some equivalent.

Figure 4:
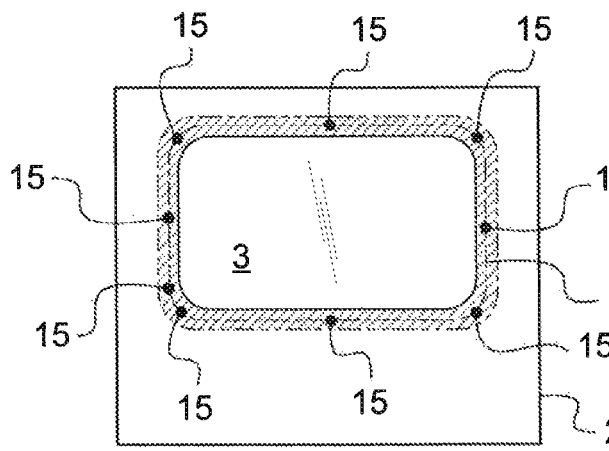

With reference to FIG. 4, an operator distributes the studs 15 along a support 100, and, in the example shown diagrammatically, along the peripheral wall 4. The operator optimizes the distribution of the studs as a function of the geometrical shape of the support.

Each stud 15 may be centered on a geometrically middle axis AX subdividing the support into two portions of equal width.

This step is particularly easy to implement when each of the studs has a self-adhesive face.

Figure 5:
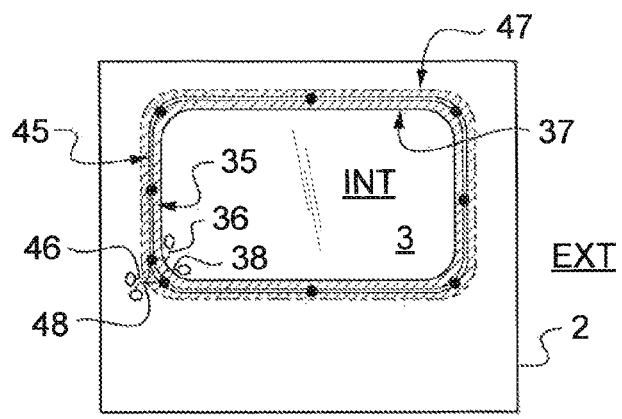

With reference to FIG. 5, the extraction wires 35, 45 of the device 10 are then put in place.

It should be noted that the inner extraction wire 35 faces towards the inside INT of the vehicle, the outer extraction wire 45 facing towards the outside EXT of the vehicle. Therefore, the two extraction wires 35, 45 do not cross over.

In addition, the operator places the ends 36, 38, 46, 48 outside the support to be adhesively bonded. These ends may be arranged in dedicated recesses (not shown).

Figure 6:
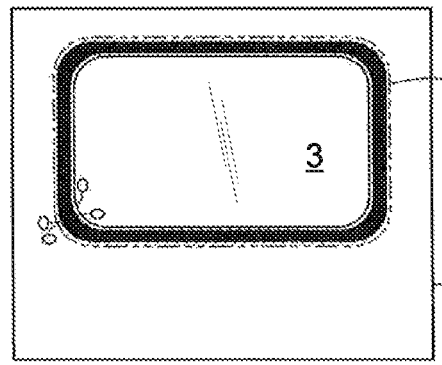

With reference to FIG. 6, the operator then applies a bead of adhesive 50 to the support equipped with the studs 15, the studs 15 and the central portions of the extraction wires being disposed within the bead of adhesive, rather than within a seal.

Figure 7:
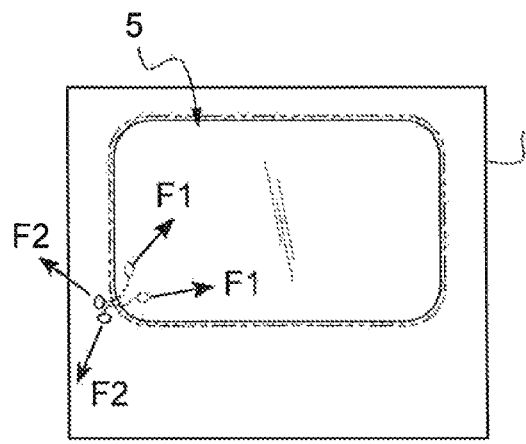

With reference to FIG. 7, the support that is not equipped with the studs is then applied to the bead of adhesive and the studs. In the variant shown, the panel 5 and more precisely its peripheral surface to be adhesively bonded is thus placed on the bead of adhesive.

The usual drying time should then be left.

Figure 8:
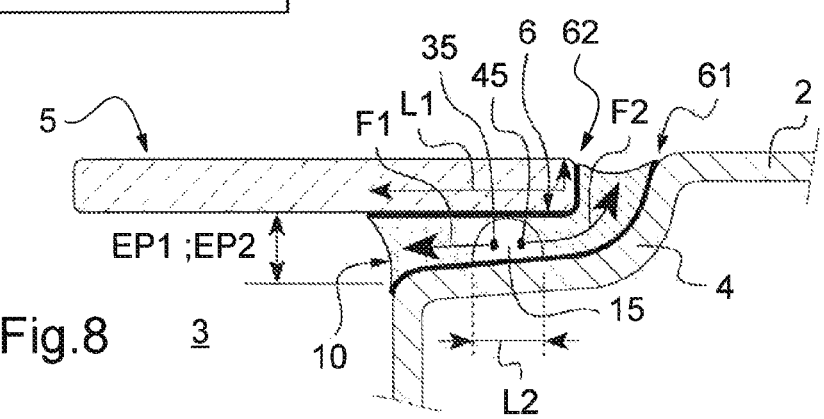
FIG. 8 is section view showing a fastening device.

With reference to FIG. 8, the panel 5 is then adhesively bonded to the structure 2.

It should be noted that it is possible, during the method, to apply a first coat of keying primer 61 to the peripheral wall 4 and a second coat 62 of keying primer to a peripheral surface 6 of the panel 5, which surface is to be adhesively bonded.

In addition, it can be noted that each stud is placed substantially in the center of the bead of adhesive 50.

Then, in order to disunite the panel from the structure 2, an operator can take hold of the ends of an extraction wire by hand or by using a tool. The operator then exerts a force on said extraction wire. For example, if the operator takes hold of the inner extraction wire 35, then the operator exerts a force on said wire towards the inside of the vehicle as indicated by the arrow F1 while going all the way around the panel.

The extraction wire then slices through the bead of adhesive in part.

By exerting a force towards the outside of the vehicle on the other extraction wire, the operator slices through the bead of adhesive in a new direction. For example, the operator exerts a force on the outer extraction wire 45 towards the outside of the vehicle as indicated by the arrow F2.

A portion of the bead of adhesive remains attached to the structure 2 while the other portion of the bead of adhesive remains attached to the panel 5.

Optionally, manual pressure on the panel makes it possible to disunite the panel completely from the structure 2, so as to release the studs or any portion of the bead of adhesive lying between the two extraction wires.

It can be understood that the function of each extraction wire is not to slice through the entire width of the bead of adhesive. It thus becomes possible to slice through wide beads of adhesive, of the type used in the aviation field, in particular.

For example, the bead of adhesive 50 extends:

against a peripheral surface 6 of the panel 5, which surface is to be adhesively bonded, over a width L1 of adhesive greater than two centimeters and greater than the width L2 of the stud; and from the peripheral top surface 6 to be adhesively bonded over a thickness EP1 less than five millimeters and equal to a thickness EP2 of the studs 15.

Naturally, numerous implementation variations may be made to the present invention. Although several embodiments are described above, it can readily be understood that it is not conceivable to identify exhaustively all of the possible embodiments. It is naturally possible to replace any of the means described with equivalent means without going beyond the ambit of the present invention.

What is claimed is:

1. A vehicle comprising:
a structure having a peripheral wall defining a window with a peripheral edge of the wall extending around a perimeter of the window;
a panel sized to close off the window, the panel and the peripheral wall defining a channel therebetween such that the channel extends around the perimeter of the window;
a device positioned about the peripheral wall and within the channel, the device having a plurality of studs and two extraction wires, each stud having two longitudinal orifices, each wire passing through a respective longitudinal orifice in each stud and extending within the channel, the studs spaced apart from one another along the extraction wires, each extraction wire having an end that is positioned outside the channel, wherein the two longitudinal orifices of each stud and the two wires are adjacent to and aligned with the peripheral edge of the wall to extend about the perimeter of the window; and
a bead of adhesive provided within the channel and extending about the perimeter of the window and adhesively bonding the panel to the peripheral wall, the bead of adhesive extending around the plurality of studs such that each stud is fully embedded within the adhesive between the panel and the peripheral wall, the bead of adhesive surrounding and in contact with the two extraction wires in between the studs;
wherein the device is configured to reversibly fasten the panel to the structure such that each extraction wire is configured to be transversely pulled from the respective longitudinal orifice in each stud and slice through at least a portion of the bead of adhesive when a respective end of the wire is pulled to remove the panel.

2. The vehicle of claim 1 wherein the channel and the bead of adhesive has a thickness of EP1 between the panel and the peripheral wall, the thickness EP1 being equal to a thickness of each stud;
wherein the channel and the bead of adhesive has a width L1, the width L1 being twice a width of each stud; and
wherein each stud is positioned substantially in the center of the bead of adhesive.

3. The vehicle of claim 1 wherein one side of the channel faces inside the vehicle, and the opposed side of the channel faces outside the vehicle;
wherein the end of one of the two extraction wires is arranged inside the vehicle; and
wherein the end of the other of the two extraction wires is arranged outside the vehicle.

4. The vehicle of claim 1 wherein each stud of the plurality of studs has a self-adhesive face secured within the channel to one of the peripheral wall of the structure and the panel.

5. The vehicle of claim 1 wherein each stud is a cylindrical stud having a circular base.

6. A vehicle according to claim 1, wherein the end of each extraction wire is a first end, each extraction wire extends from the first end towards a second end while going through a central portion, each central portion being embedded in the bead of adhesive.

7. A vehicle according to claim 6, wherein a width of the bead of adhesive is twice the width of each stud.

8. A vehicle according to claim 1, wherein the studs have a width (L2) and a thickness (EP2) and wherein the bead of adhesive is configured to extend against and be adhesively bonded with a peripheral surface of the panel, over the bead of adhesive having a width (L1) that is greater than two centimeters and greater than the width (L2) of the stud, and the bead of adhesive having from said peripheral top surface to be adhesively bonded over a thickness (EP1) that is less than five millimeters and equal to the thickness (EP2) of the studs.

9. A vehicle according to claim 1, wherein the end of the extraction wire is a first end, each extraction wire extending from the first end towards a second end while going through a central portion, and at least one end is provided with graspable means.

10. A vehicle according to claim 1, wherein, the two longitudinal orifices of each stud comprise an inner longitudinal orifice and an outer longitudinal orifice, and one extraction wire passes through all of the inner longitudinal orifices and the other extraction wire passes through all of the outer longitudinal orifices.

11. A vehicle according to claim 1, wherein at least one stud has at least one self-adhesive face.

12. A vehicle according to claim 1, wherein at least one stud is provided with at least one transverse groove communicating with one of the two longitudinal orifices thereby facilitating insertion of an extraction wire into the longitudinal orifice and extraction of the wire therefrom in a direction (D1) distinct from a direction (D2) in which the longitudinal orifice extends.

13. A vehicle according to claim 1, wherein the device is interposed between a first coat of keying primer placed on the peripheral wall and a second coat of keying primer placed on a peripheral surface of the panel, which surface is to be adhesively bonded.

14. A vehicle according to claim 1, wherein the end of the extraction wire is a first end, each extraction wire extending from the first end towards a second end while going through a central portion, the ends of one extraction wire are arranged inside (INT) the vehicle and the ends of the other extraction wire are arranged outside (EXT) the vehicle.

15. A method of securing together a panel and a structure using a device and a bead of adhesive within a vehicle according to claim 1, the method comprising the following steps:
   fastening each stud to one of the structure and the panel;
   arranging the two extraction wires, each extraction wire passing all the way through a longitudinal orifice in each stud;
   placing the bead of adhesive on the one of the structure and the panel, each stud being embedded in the bead of adhesive, and first and second ends of each extraction wire being kept outside the bead of adhesive; and
   placing the other of the panel and the structure that is not equipped with the studs on the bead of adhesive.

16. A method according to claim 15, wherein each stud is placed in the middle of the bead of adhesive.

17. A method according to claim 15 wherein the studs are fastened to the one of the panel and the structure such that each stud is spaced apart from adjacent studs about the peripheral wall; and
   wherein the two extraction wires are arranged through the studs such that the two extraction wires extend about the peripheral wall, and such that the studs are spaced apart along the two extraction wires.

18. The method according to claim 17 wherein the bead of adhesive is placed on the one of the panel and the structure that is equipped with the studs such that the bead of adhesive surrounds and is in contact with the two extraction wires between adjacent studs; and
   wherein each extraction wire is configured to slice through at least a portion of the bead of adhesive when a respective end of the wire is pulled to remove the panel from the structure.

* * * * *